E. J. FRIEDRICH.
CLUTCH PEDAL LOCK FOR AUTOMOBILES.
APPLICATION FILED SEPT. 2, 1920.
1,388,149.
Patented Aug. 16, 1921.
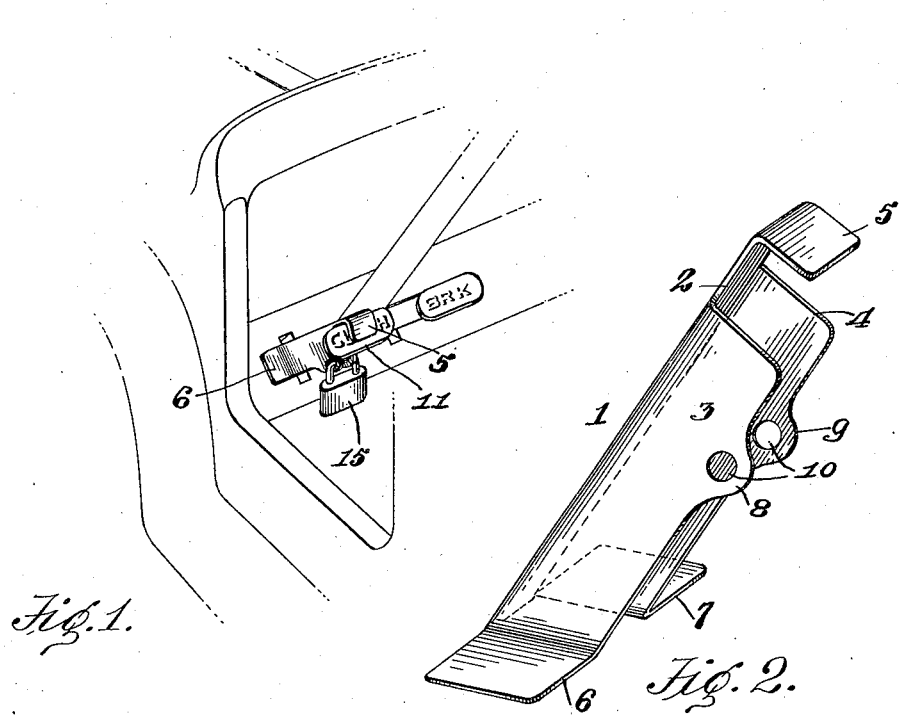
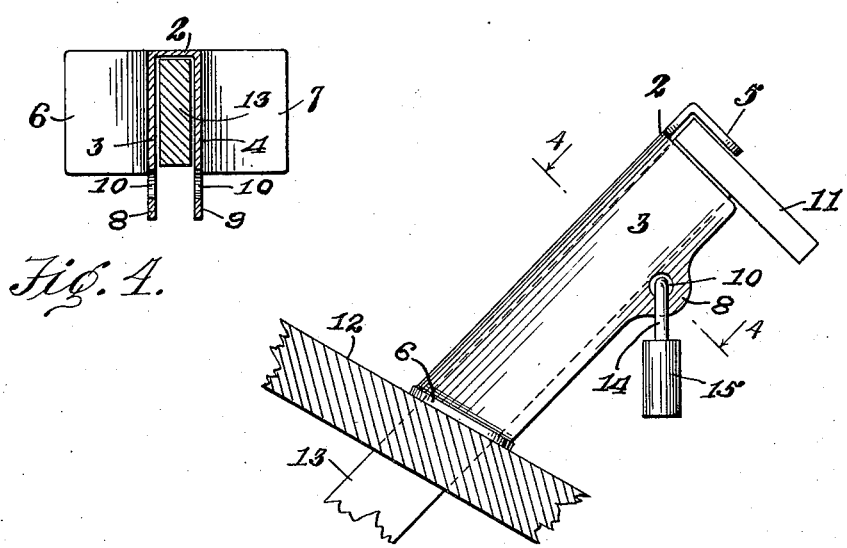
Inventor
Edward John Friedrich
By his Attorney
William Thomas Jones

UNITED STATES PATENT OFFICE.

EDWARD JOHN FRIEDRICH, OF MINNEAPOLIS, MINNESOTA.

CLUTCH-PEDAL LOCK FOR AUTOMOBILES.

1,388,149. Specification of Letters Patent. Patented Aug. 16, 1921.

Application filed September 2, 1920. Serial No. 407,715.

*To all whom it may concern:*

Be it known that I, EDWARD JOHN FRIEDRICH, a citizen of the United States, residing in the county of Hennepin, city of Minneapolis, and State of Minnesota, have invented certain new and useful Improvements in Clutch-Pedal Locks for Automobiles; and I do hereby declare the following to be a full, clear, and exact description of the invention, such as will enable others skilled in the art to which it appertains to make and use the same.

My invention relates to a lock for automobiles, and more particularly to a lock which is designed to be applied to the clutch pedal of an automobile in such manner as to render the pedal incapable of operation.

To the accomplishment of the recited object, and others subordinate thereto, the preferred embodiment of my invention resides in the arrangement and construction of the parts shown in the accompanying drawings, hereinafter described, and embraced within the scope of the appended claim.

In said drawings:

Figure 1 is a fragmentary perspective view of the dash of an automobile showing the application of the invention.

Fig. 2 is a perspective view of the lock removed.

Fig. 3 is a side elevation of the lock in position on the clutch pedal, and

Fig. 4 is a transverse sectional view taken along line 4—4 of Fig. 3.

Generally speaking, the invention comprises an integral sheath with a flange at its top adapted for engagement with the top of the clutch pedal, a pair of flanges at its base which impinge against the foot board immediately adjacent the opening therein which receives the shank of the pedal, and a pair of ears having apertures through which any conventional type of pad-lock, or the like, may be inserted and securely locked.

Referring more particularly to the drawings, 1 designates the sheath which is formed from a single piece of sheet metal, and comprises a substantially rectangular body with a rear portion 2, and parallel side portions 3 and 4. The rear portion 2 is extended beyond the upper edges of the side members 3 and 4, and deflected forwardly, as at 5, to present an angular engaging element, the function of which will be hereinafter set forth. The lower extremities of the sides 3 and 4 are also bent outwardly to form laterally extending flanges 6 and 7, the flanges obviously projecting in opposite directions, as can be clearly seen in Figs. 2 and 4 of the drawings. Furthermore, the upper ends of the sides are merged into ears 8 and 9, and these in turn, have openings 10 therein arranged in perfect alinement.

In operation, the device is placed about the clutch pedal 11, with the angular deflection 5 occupying a position directly on top of the pedal, the flanges 6 and 7 resting against the foot-board 12, and the sides 3 and 4 and the rear 2 embracing the shank 13 of the pedal, intermediate the pedal 11 and the foot board 12.

In this position the bail 14 of the padlock 15 is passed through openings 10 of the ears, and suitably locked. It will be seen that, when applied, this device will absolutely preclude any movement of the clutch pedal, and consequently, it will be impossible to operate the machine, thereby eliminating, to a very large degree, the theft of automobiles. Furthermore, the device is extremely simple in construction, being constructed from a single piece of sheet metal. Still further, the device may be manifestly manufactured and sold at a very low figure, thus permitting of its very wide distribution and use.

What I claim is:

The combination with a clutch pedal and foot-board of an automobile, of a rigid device adapted to be interposed between the pedal and the foot-board, said device being formed from a single piece of sheet metal bent to present a rear portion, and a pair of parallel side members, said rear portion extending beyond the top edges of the side members and being bent at right angles to engage the upper face of the pedal transversely, while the lower extremities of said side members are flexed outwardly to provide flanges for engagement with the foot-board and the forward portions of the side members are merged into parallel ears, the device in its entirety having an open front, and being slidable into its final position between the pedal and foot-board, and means for locking the ears together.

In testimony whereof I affix my signature.

EDWARD JOHN FRIEDRICH.